United States Patent
Hong

(10) Patent No.: US 12,002,395 B2
(45) Date of Patent: Jun. 4, 2024

(54) DISPLAY APPARATUS AND METHOD OF DRIVING THE SAME

(71) Applicant: Samsung Display Co., LTD., Yongin-si (KR)

(72) Inventor: Seokha Hong, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/494,792

(22) Filed: Oct. 5, 2021

(65) Prior Publication Data

US 2022/0208054 A1    Jun. 30, 2022

(30) Foreign Application Priority Data

Dec. 14, 2020  (KR) .......................... 10-2020-0174800

(51) Int. Cl.
*G09G 3/20* (2006.01)
*G06F 3/14* (2006.01)
*G09G 3/3233* (2016.01)

(52) U.S. Cl.
CPC ............. *G09G 3/20* (2013.01); *G06F 3/1446* (2013.01); *G06F 3/1423* (2013.01); *G09G 3/3233* (2013.01); *G09G 2300/026* (2013.01); *G09G 2300/043* (2013.01); *G09G 2310/0272* (2013.01); *G09G 2330/021* (2013.01)

(58) Field of Classification Search
CPC ............. G09G 3/20; G09G 2300/043; G09G 2310/0272; G09G 2330/021; G09G 2300/026; G09G 3/3233; G06F 3/1446; G06F 3/1423
See application file for complete search history.

(56) References Cited

U.S. PATENT DOCUMENTS

| | | | |
|---|---|---|---|
| 9,208,721 B2 | 12/2015 | Odawara et al. | |
| 9,734,765 B2 | 8/2017 | Kwon et al. | |
| 2001/0024186 A1* | 9/2001 | Kane | G09G 3/3291 345/82 |
| 2005/0062884 A1* | 3/2005 | Fan | H04N 9/12 345/1.3 |
| 2006/0027822 A1* | 2/2006 | Choi | G09G 3/3233 257/94 |

(Continued)

FOREIGN PATENT DOCUMENTS

| KR | 10-1276456 | 6/2013 |
|---|---|---|
| KR | 10-2015-0057192 | 5/2015 |

(Continued)

*Primary Examiner* — William Boddie
*Assistant Examiner* — Saifeldin E Elnafia
(74) *Attorney, Agent, or Firm* — KILE PARK REED & HOUTTEMAN PLLC

(57) ABSTRACT

A display apparatus includes a plurality of display panels, a current sensor, a driving controller and a data driver. The current sensor is configured to sense a current of each of the display panels. The driving controller is configured to generate a compensation value of each of the display panels based on the current of each of the display panels and to generate a data signal of each of the display panels based on the compensation value. The data driver is configured to convert the data signal into a data voltage and to output the data voltage to each of the display panels.

15 Claims, 9 Drawing Sheets

(56) References Cited

U.S. PATENT DOCUMENTS

| | | | | |
|---|---|---|---|---|
| 2013/0293499 A1* | 11/2013 | Chang | ................. | G06F 3/04166 |
| | | | | 345/173 |
| 2014/0092076 A1* | 4/2014 | Lee | ...................... | G09G 3/3291 |
| | | | | 345/212 |
| 2016/0246432 A1* | 8/2016 | Hong | ................... | G09G 3/3275 |

FOREIGN PATENT DOCUMENTS

| | | |
|---|---|---|
| KR | 10-1954934 | 2/2019 |
| KR | 10-2019-0081809 | 7/2019 |

* cited by examiner

DISPLAY APPARATUS AND METHOD OF DRIVING THE SAME

CROSS REFERENCE TO RELATED APPLICATION

This application claims priority from and the benefit of Korean Patent Application No. 10-2020-0174800, filed on Dec. 14, 2020, which is hereby incorporated by reference for all purposes as if fully set forth herein.

BACKGROUND

Field

Embodiments of the invention relate generally to a display apparatus and a method of driving the display apparatus. More particularly, embodiments of the present inventive concept relate to a display apparatus including a plurality of display panels and sensing currents of the display panels to accurately compensate images of the display panels and a method of driving the display apparatus.

Discussion of the Background

Recently, interest in display apparatuses is increasing. Accordingly, the display apparatuses are manufactured in various types such as an organic light emitting diode ("OLED") display apparatus and a liquid crystal display ("LCD") apparatus.

In addition, study is being conducted to enlarge the display apparatus. The enlarged display apparatus may include a plurality of display panels. For example, the display apparatus may include a tiled display apparatus which combines a plurality of display panels to form one display apparatus.

In the tiled display apparatus, currents of the display panels may be sensed to compensate image data. When a same compensation value is applied to the display panels, an accuracy of the compensation may be decreased.

The above information disclosed in this Background section is only for understanding of the background of the inventive concepts, and, therefore, it may contain information that does not constitute prior art.

SUMMARY OF THE INVENTIVE CONCEPT

Embodiments of the present inventive concept provide a display apparatus configured to compensate a difference of luminances and a difference of color differences generated at boundaries of display panels to enhance a display quality of the display apparatus.

Embodiments of the present inventive concept also provide a method of driving the display apparatus.

Additional features of the inventive concepts will be set forth in the description which follows, and in part will be apparent from the description, or may be learned by practice of the inventive concepts.

In an embodiment of a display apparatus according to the present inventive concept, the display apparatus includes a plurality of display panels, a current sensor, a driving controller and a data driver. The current sensor is configured to sense a current of each of the display panels. The driving controller is configured to generate a compensation value of each of the display panels based on the current of each of the display panels and to generate a data signal of each of the display panels based on the compensation value. The data driver is configured to convert the data signal into a data voltage and to output the data voltage to each of the display panels.

In an embodiment, the display apparatus may further include a first power supply line configured to supply a power to a first display panel of the display panels, a first switch connected to the first power supply line, a second power supply line configured to supply a power to a second display panel of the display panels and a second switch connected to the second power supply line.

In an embodiment, the first switch and the second switch may be turned on in a non-sensing period.

In an embodiment, the first switch and the second switch may be turned on in a non-sensing period. The first switch may be turned on and the second switch may be turned off in a second duration of the sensing period.

In an embodiment, the display panels may be driven in a unit of a frame. The frame may include an active period and a vertical blank period. The sensing period may be disposed in the vertical blank period.

In an embodiment, the current sensor may include a load connected to both ends of the first switch and both ends of the second switch.

In an embodiment, the display apparatus may further include a first power supply line configured to supply a power to a first display panel of the display panels, a first switch connected to the first power supply line, a second power supply line configured to supply a power to a second display panel of the display panels, a second switch connected to the second power supply line, a third power supply line configured to supply a power to a third display panel of the display panels, a third switch connected to the third power supply line, a fourth power supply line configured to supply a power to a fourth display panel of the display panels and a fourth switch connected to the fourth power supply line.

In an embodiment, the first switch, the second switch, the third switch and the fourth switch may be turned on in a non-sensing period.

In an embodiment, the first switch may be turned off and the second switch, the third switch and the fourth switch may be turned on in a first duration of a sensing period. The second switch may be turned off and the first switch, the third switch and the fourth switch may be turned on in a second duration of the sensing period. The third switch may be turned off and the first switch, the second switch and the fourth switch may be turned on in a third duration of the sensing period. The fourth switch may be turned off and the first switch, the second switch and the third switch may be turned on in a fourth duration of the sensing period.

In an embodiment, the current sensor may include a load connected to both ends of a power supply line configured to supply a power to the display panel and an analog to digital converter configured to convert an analog current signal received from the load to a digital current signal.

In an embodiment, the driving controller may include an image analyzer configured to analyze input image data to generate a target current, a comparator configured to compare the target current and a sensed current of the current sensor to generate a compensation value and a compensator configured to generate the data signal based on the input image data and the compensation value.

In an embodiment, the compensation value may be a scale factor which is multiplied by a grayscale value of the input image data. When the sensed current is greater than the target current, the scale factor may be set to be less than 1.

When the sensed current is less than the target current, the scale factor may be set to be greater than 1.

In an embodiment, each of the display panels may include a plurality of display blocks. The current sensor may be configured to sense a current of each of the display blocks. The driving controller may be configured to generate a compensation value of each of the display blocks based on the current of each of the display blocks.

In an embodiment, the display apparatus may include a plurality of the current sensors. The current sensors may be connected to the display panels in a one-to-one correspondence. A number of the current sensors may be the same as a number of the display panels.

In an embodiment of a method of driving a display apparatus including a plurality of display panels according to the present inventive concept, the method includes sensing a current of each of the display panels, generating a compensation value of each of the display panels based on the current of each of the display panels, generating a data signal of each of the display panels based on the compensation value, converting the data signal into a data voltage and outputting the data voltage to each of the display panels.

In an embodiment, the display apparatus may further include a first power supply line configured to supply a power to a first display panel of the display panels, a first switch connected to the first power supply line, a second power supply line configured to supply a power to a second display panel of the display panels and a second switch connected to the second power supply line.

In an embodiment, the first switch and the second switch may be turned on in a non-sensing period. The first switch may be turned off and the second switch may be turned on in a first duration of a sensing period. The first switch may be turned on and the second switch may be turned off in a second duration of the sensing period.

In an embodiment, the display panels may be driven in a unit of a frame. The frame may include an active period and a vertical blank period. The sensing period may be disposed in the vertical blank period.

In an embodiment, the generating the compensation value may include analyzing input image data to generate a target current and comparing the target current and the sensed current to generate the compensation value. The data signal may be generated based on the input image data and the compensation value.

In an embodiment, the compensation value may be a scale factor which is multiplied by a grayscale value of the input image data. When the sensed current is greater than the target current, the scale factor may be set to be less than 1. When the sensed current is less than the target current, the scale factor may be set to be greater than 1.

According to the display apparatus and the method of driving the display apparatus, the currents of the respective display panels included in the display apparatus may be sensed, the compensation values for the respective display panels may be generated and the input image data of the respective display panels may be compensated.

Thus, the accuracy of the current compensation may be greatly enhanced compared to a case in which the same compensation value is applied to the plurality of display panels. Thus, the display quality of the display apparatus may be enhanced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION OF THE INVENTIVE CONCEPT

Figure 1:
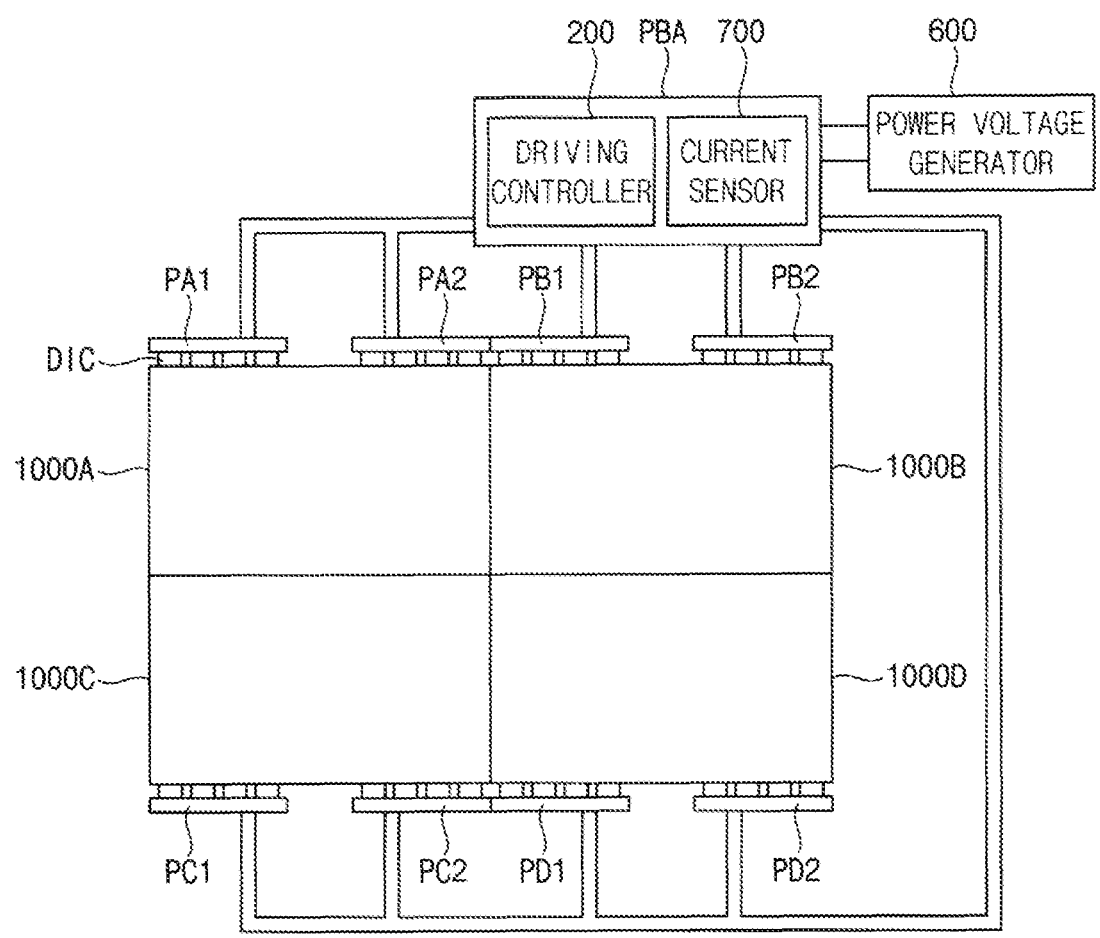
FIG. 1 is a block diagram illustrating a display apparatus according to an embodiment of the present inventive concept.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are illustrated in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
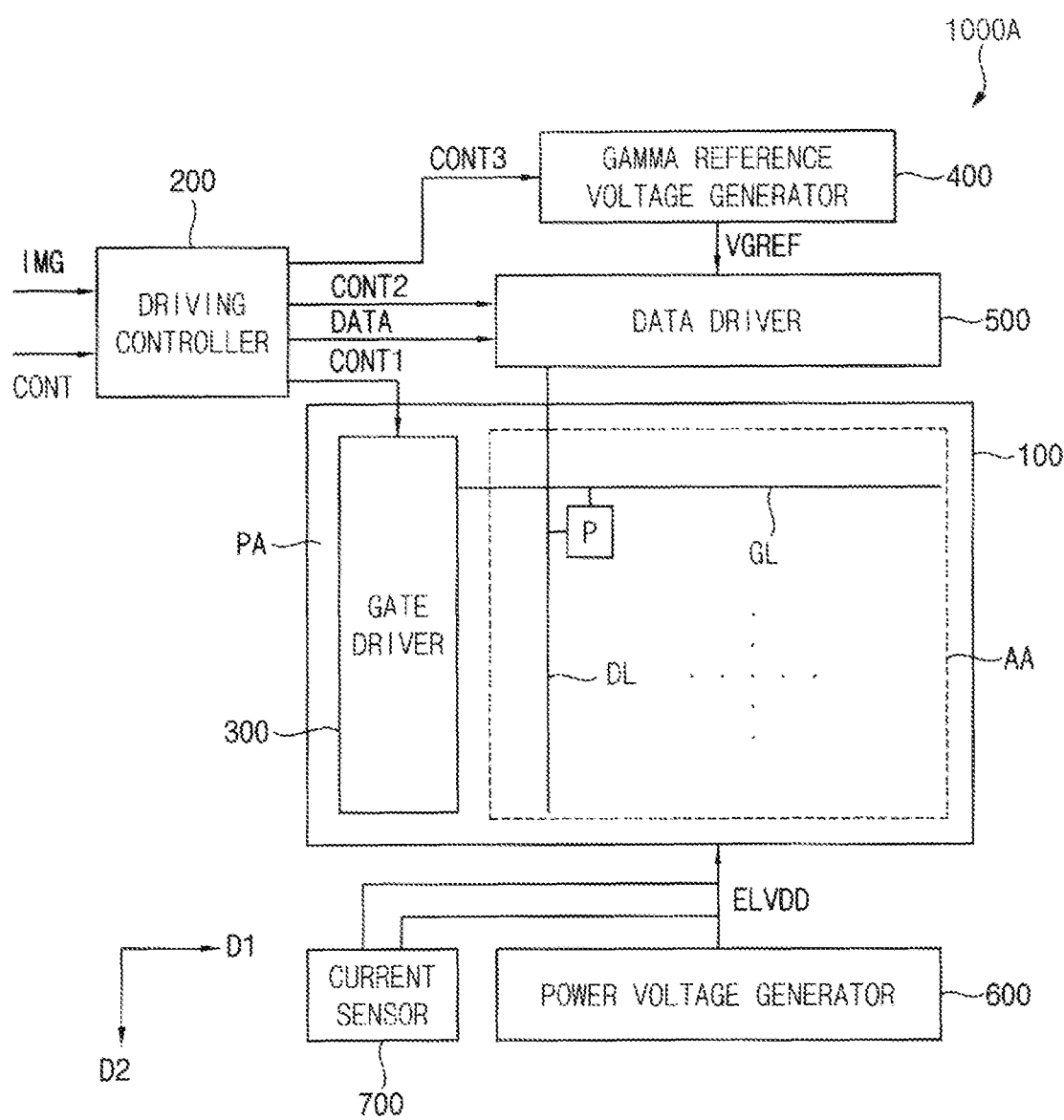
FIG. 2 is a block diagram illustrating an operation of a first display panel of FIG. 1.

FIG. 1 is a block diagram illustrating a display apparatus according to an embodiment of the present inventive concept. FIG. 2 is a block diagram illustrating an operation of a first display panel 1000A of FIG. 1.

Referring to FIGS. 1 and 2, the display apparatus includes a plurality of display panels 1000A, 1000B, 1000C and 1000D connected to each other. In the present embodiment, the display apparatus may include four display panels 1000A, 1000B, 1000C and 1000D disposed in two rows and two columns. The four display panels 1000A, 1000B, 1000C and 1000D may form a large sized television.

For example, the display panels may include a first display panel 1000A, a second display panel 1000B, a third display panel 1000C and a fourth display panel 1000D which are disposed in two rows and two columns.

The second display panel 1000B may be disposed adjacent to the first display panel 1000A in a first direction D1 (e.g. a horizontal direction). The third display panel 1000C may be disposed adjacent to the first display panel 1000A in a second direction D2 (e.g. a vertical direction). The fourth display panel 1000D may be disposed adjacent to the third display panel 1000C in the first direction D1.

The display apparatus may include a printed circuit board assembly PBA, a first printed circuit PA1, a second printed circuit PA2, a third printed circuit PB1, a fourth printed circuit PB2, a fifth printed circuit PC1, a sixth printed circuit PC2, a seventh printed circuit PD1 and an eighth printed circuit PD2.

The first printed circuit PA1 and the second printed circuit PA2 may be connected to the first display panel 1000A. The third printed circuit PB1 and the fourth printed circuit PB2 may be connected to the second display panel 1000B. The fifth printed circuit PC1 and the sixth printed circuit PC2 may be connected to the third display panel 1000C. The seventh printed circuit PD1 and the eighth printed circuit PD2 may be connected to the fourth display panel 1000D.

The printed circuit board assembly PBA may be connected to the first to eighth printed circuits PA1, PA2, PB1, PB2, PC1, PC2, PD1 and PD2. For example, the driving controller 200 may be disposed on the printed circuit board assembly PBA.

The display apparatus may include a plurality of flexible circuits connected to the first printed circuit PA1 and the first display panel 1000A. In addition, the display apparatus may include a plurality of flexible circuits connected to the second printed circuit PA2 and the first display panel 1000A. The display apparatus may include a plurality of flexible circuits connected to the third printed circuit PB1 and the second display panel 1000B. In addition, the display apparatus may include a plurality of flexible circuits connected to the fourth printed circuit PB2 and the second display panel 1000B. The display apparatus may include a plurality of flexible circuits connected to the fifth printed circuit PC1 and the third display panel 1000C. In addition, the display apparatus may include a plurality of flexible circuits connected to the sixth printed circuit PC2 and the third display panel 1000C. The display apparatus may include a plurality of flexible circuits connected to the seventh printed circuit PD1 and the fourth display panel 1000D. In addition, the display apparatus may include a plurality of flexible circuits connected to the eighth printed circuit PD2 and the fourth display panel 1000D.

A plurality of data driving chips DIC of the data driver 500 may be respectively disposed in the flexible circuits. The data driving chip DIC may be an integrated circuit chip.

For example, the data driver 500 of the display apparatus may include the plurality of data driving chips DIC corresponding to one display panel. Although the display apparatus includes eighth data driving chips DIC corresponding to one display panel in FIG. 1, the present inventive concept may not be limited to the number of the data driving chips DIC.

As illustrated in FIG. 1, for example, the display apparatus may include four display panels 1000A, 1000B, 1000C and 1000D, one driving controller 200, one power voltage generator 600 and one current sensor 700.

Each of the display panels 1000A, 1000B, 1000C and 1000D may include a plurality of pixels P.

The operation of one display panel is explained referring to FIG. 2 based on the first display panel 1000A. The operations of the second display panel 1000B, the third display panel 1000C and the fourth display panel 1000D may be substantially the same as the operation of the first display panel 1000A.

The display apparatus includes a display panel (e.g. first display panel 1000A) and a display panel driver. The display panel driver includes a driving controller 200, a gate driver 300, a gamma reference voltage generator 400, a data driver 500 and a power voltage generator 600. The display apparatus may further include a current sensor 700.

The display panel (e.g. the first display panel 1000A) has a display region AA on which an image is displayed and a peripheral region PA adjacent to the display region AA.

The display panel (e.g. the first display panel 1000A) includes a plurality of gate lines GL, a plurality of data lines DL and a plurality of pixels P connected to the gate lines GL and the data lines DL. The gate lines GL extend in a first direction D1 and the data lines DL extend in a second direction D2 crossing the first direction D1.

The driving controller 200 receives input image data IMG and an input control signal CONT from an external apparatus. For example, the input image data IMG may include red image data, green image data and blue image data. For example, the input image data IMG may include white image data. The input image data IMG may include magenta image data, yellow image data and cyan image data. The input control signal CONT may include a master clock signal and a data enable signal. The input control signal CONT may include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 configured to control an operation of the gate driver 300 based on the input control signal CONT, and outputs the first control signal CONT1 to the gate driver 300. The first control signal CONT1 may further include a vertical start signal and a gate clock signal.

The driving controller 200 generates the second control signal CONT2 configured to control an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 configured to control an operation of the gamma reference voltage generator 400 based on the input control signal CONT, and outputs the third control signal CONT3 to the gamma reference voltage generator 400.

The gate driver 300 generates gate signals driving the gate lines GL in response to the first control signal CONT1 received from the driving controller 200. The gate driver 300 outputs the gate signals to the gate lines GL. For example, the gate driver 300 may sequentially output the gate signals to the gate lines GL.

In the present embodiment, the gate driver 300 may be integrated in the peripheral region PA of the display panel (e.g. the first display panel 1000A). Alternatively, the gate driver 300 may be disposed adjacent to a first side of the display panel (e.g. the first display panel 1000A) and out of the display panel (e.g. the first display panel 1000A) like the data driver 500.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The power voltage generator 600 may generate a power voltage of the display panel (e.g. the first display panel 1000A). For example, the display panel (e.g. the first display panel 1000A) includes the pixels P. A high power voltage (e.g. ELVDD) and a low power voltage (e.g. ELVSS) may be applied to the pixels P. The power voltage generator 600 may generate the high power voltage ELVDD applied to the pixels P. For example, the power voltage generator 600 may generate the low power voltage ELVSS applied to the pixels P, a gate on voltage and a gate off voltage of the gate driver 300 and a driving voltage of the data driver 500 and a driving voltage of the driving controller 200.

For example, the power voltage generator 600 may be disposed out of the printed circuit board assembly PBA. Alternatively, the power voltage generator 600 may be disposed on the printed circuit board assembly PBA.

The current sensor 700 may sense a current from each of the display panels. The current sensor 700 may sense a current of a power supply line applying the high power voltage (e.g. ELVDD).

Figure 3:
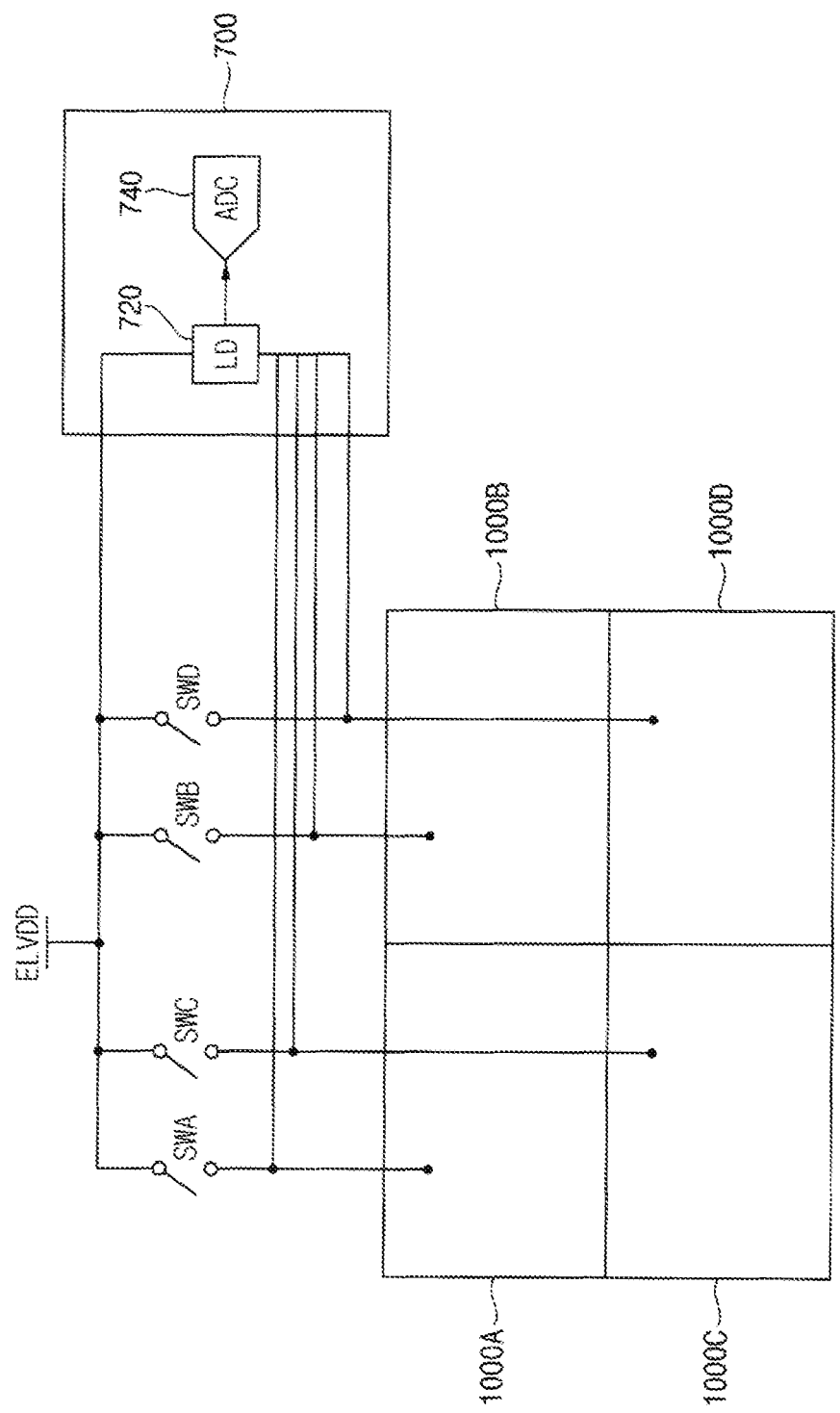
FIG. 3 is a diagram illustrating connections between first to fourth display panels of FIG. 1 and a current sensor of FIG. 1.
Figure 4:
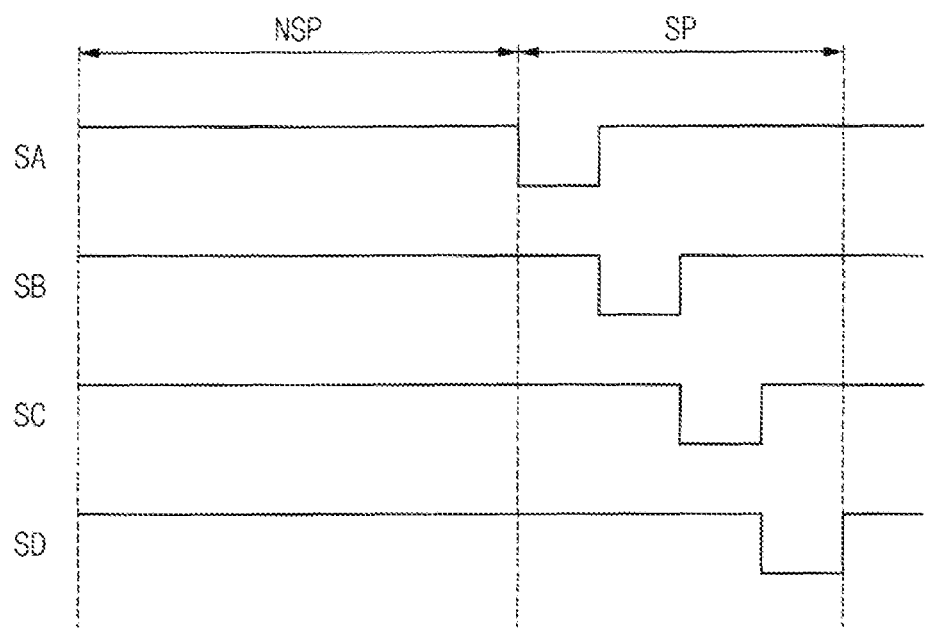
FIG. 4 is a timing diagram illustrating operations of first to fourth switches of FIG. 3.
Figure 5:
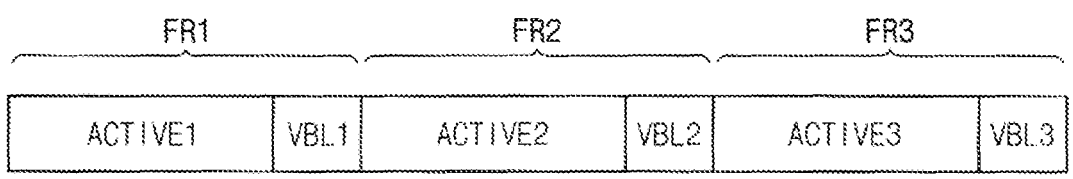
FIG. 5 is a diagram illustrating a driving timing of the display apparatus of FIG. 1.

FIG. 3 is a diagram illustrating connections between first to fourth display panels 1000A, 1000B, 1000C and 1000D of FIG. 1 and the current sensor 700 of FIG. 1. FIG. 4 is a timing diagram illustrating operations of first to fourth switches SWA, SWB, SWC and SWD of FIG. 3. FIG. 5 is a diagram illustrating a driving timing of the display apparatus of FIG. 1.

Referring to FIGS. 1 to 5, the current sensor 700 senses the current of each of the display panels 1000A, 1000B, 1000C and 1000D.

The display apparatus may include a first power supply line supplying a power to the first display panel 1000A, a first switch SWA connected to the first power supply line, a second power supply line supplying a power to the second display panel 1000B, a second switch SWB connected to the second power supply line, a third power supply line supplying a power to the third display panel 1000C, a third switch SWC connected to the third power supply line, a fourth power supply line supplying a power to the fourth display panel 1000D and a fourth switch SWD connected to the fourth power supply line.

In a non-sensing period NSP when the current sensor 700 does not sense the currents of the display panels 1000A, 1000B, 1000C and 1000D, the first switch SWA, the second switch SWB, the third switch SWC and the fourth switch SWD may be turned on.

In a sensing period SP when the current sensor 700 senses the currents of the display panels 1000A, 1000B, 1000C and 1000D, the first switch SWA, the second switch SWB, the third switch SWC and the fourth switch SWD may be sequentially turned on and off.

The first to fourth switches SWA, SWB, SWC and SWD may be controlled by first to fourth switching control signals SA, SB, SC and SD. For example, when the first to fourth switching control signals SA, SB, SC and SD respectively have a high level, the first to fourth switches SWA, SWB, SWC and SWD may be respectively turned on. In contrast, when the first to fourth switching control signals SA, SB, SC and SD respectively have a low level, the first to fourth switches SWA, SWB, SWC and SWD may be respectively turned off.

For example, in a first duration of the sensing period SP when the current of the first display panel 1000A is sensed, the first switch SWA may be turned off and the second switch SWB, the third switch SWC and the fourth switch SWD may be turned on.

When the first switch SWA is turned off and the second switch SWB, the third switch SWC and the fourth switch SWD are turned on, a path of the power (e.g. ELVDD) supplied to the first display panel 1000A is not formed directly from the ELVDD source but is formed through a load LD of the current sensor 700. As illustrated in FIG. 3, paths of the power (e.g. ELVDD) supplied to the second to fourth display panels 1000B, 1000C and 1000D are directly formed from ELVDD to the second to fourth display panels 1000B, 1000C and 1000D not through the load LD of the current sensor 700.

Thus, the current sensor 700 may sense the current of the first display panel 1000A flowing through the load LD.

Similarly, in a second duration of the sensing period SP when the current of the second display panel 1000B is sensed, the second switch SWB may be turned off and the first switch SWA, the third switch SWC and the fourth switch SWD may be turned on.

When the second switch SWB is turned off and the first switch SWA, the third switch SWC and the fourth switch SWD are turned on, the path of the power (e.g. ELVDD) supplied to the second display panel 1000B is not formed directly from the ELVDD source but is formed through the load LD of the current sensor 700. The paths of the power (e.g. ELVDD) supplied to the first, third and fourth display panels 1000A, 1000C and 1000D are directly formed from ELVDD to the first, third and fourth display panels 1000A, 1000C and 1000D not through the load LD of the current sensor 700.

Thus, the current sensor 700 may sense the current of the second display panel 1000B flowing through the load LD.

In a third duration of the sensing period SP when the current of the third display panel 1000C is sensed, the third switch SWC may be turned off and the first switch SWA, the second switch SWB and the fourth switch SWD may be turned on.

When the third switch SWC is turned off and the first switch SWA, the second switch SWB and the fourth switch SWD are turned on, the path of the power (e.g. ELVDD) supplied to the third display panel 1000C is not formed directly from the ELVDD source but is formed through the load LD of the current sensor 700. The paths of the power (e.g. ELVDD) supplied to the first, second and fourth display panels 1000A, 1000B and 1000D are directly formed from ELVDD to the first, second and fourth display panels 1000A, 1000B and 1000D not through the load LD of the current sensor 700.

Thus, the current sensor 700 may sense the current of the third display panel 1000C flowing through the load LD.

For example, in a fourth duration of the sensing period SP when the current of the fourth display panel 1000D is sensed, the fourth switch SWD may be turned off and the first switch SWA, the second switch SWB and the third switch SWC may be turned on.

When the fourth switch SWD is turned off and the first switch SWA, the second switch SWB and the third switch SWC are turned on, the path of the power (e.g. ELVDD) supplied to the fourth display panel 1000D is not formed directly from the ELVDD source but is formed through the load LD of the current sensor 700. The paths of the power (e.g. ELVDD) supplied to the first, second and third display panels 1000A, 1000B and 1000C are directly formed from ELVDD to the first, second and third display panels 1000A, 1000B and 1000C not through the load LD of the current sensor 700.

Thus, the current sensor 700 may sense the current of the fourth display panel 1000D flowing through the load LD.

As illustrated in FIG. 4, the display panels 1000A, 1000B, 1000C and 1000D may be driven in a unit of a frame (e.g. FR1, FR2 and FR3). The frame FR1, FR2 and FR3 may include an active period ACTIVE1, ACTIVE2 and ACTIVE3 and a vertical blank period VBL1, VBL2 and VBL3. The data voltages may be applied to the pixels P of the display panels 1000A, 1000B, 1000C and 1000D in the active period ACTIVE1, ACTIVE2 and ACTIVE3. The data voltages may not be applied to the pixels P of the display panels 1000A, 1000B, 1000C and 1000D in the vertical blank period VBL1, VBL2 and VBL3.

For example, the sensing period SP may be disposed in the vertical blank period VBL1, VBL2 and VBL3. For example, the currents of the display panels 1000A, 1000B, 1000C and 1000D may be sensed during a first vertical period VBL1 and a data voltage which is compensated using the sensed current may be written to the pixels P during a second active period ACTIVE2. Also, the currents of the display panels 1000A, 1000B, 1000C and 1000D may be sensed during a second vertical period VBL2 and a data voltage which is compensated using the sensed current may be written to the pixels P during a third active period ACTIVE3.

In this way, the compensation value may be reflected in the data voltage every frame. However, a compensation cycle may not be limited to the frame, but the compensation cycle may be longer than the frame. In addition, the compensation cycle may be set irrespective of the frame.

The current sensor 700 may include the load 720 (LD) connected to both ends of the power supply lines supplying the power to the display panels 1000A, 1000B, 1000C and 1000D and an analog to digital converter 740 (ADC) converting an analog current signal received from the load 720 (LD) to a digital current signal. The load 720 (LD) may be connected to both ends of the first switch SWA, both ends of the second switch SWB, both ends of the third switch SWC and both ends of the fourth switch SWD.

The current sensor 700 may output the digital current signal to the driving controller 200.

Figure 6:
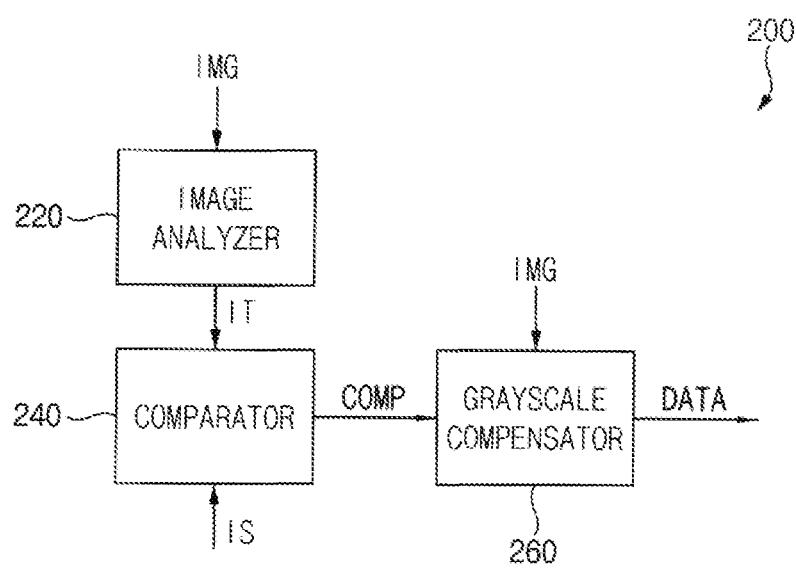
FIG. 6 is a block diagram illustrating a driving controller of FIG. 1.
Figure 7:
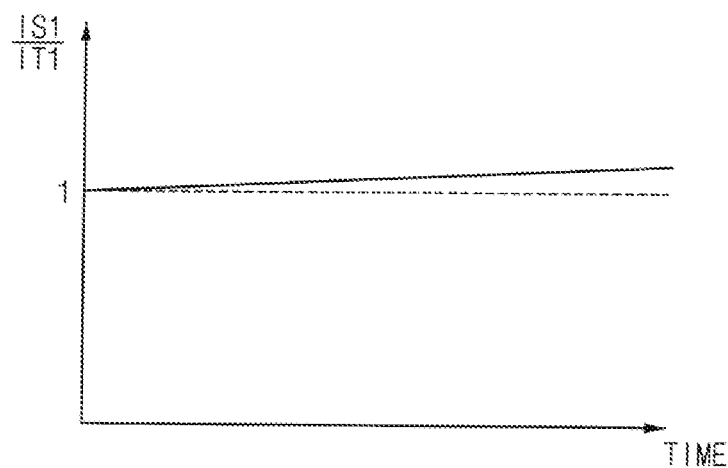
FIG. 7 is a graph illustrating a ratio between a target current and a sensed current which are inputted to a comparator of FIG. 6.
Figure 8:
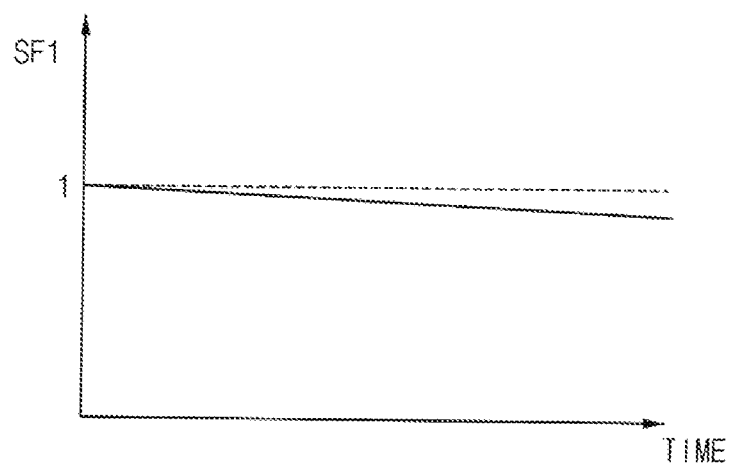
FIG. 8 is a graph illustrating a scale factor generated by the comparator of FIG. 6.
Figure 9:
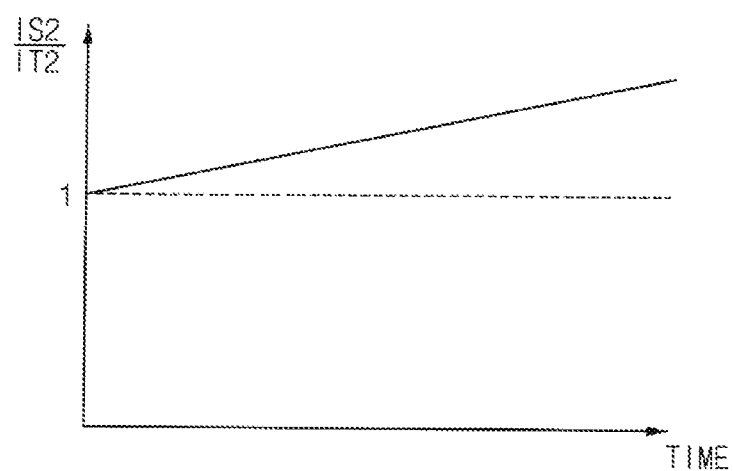
FIG. 9 is a graph illustrating a ratio between a target current and a sensed current which are inputted to the comparator of FIG. 6.
Figure 10:
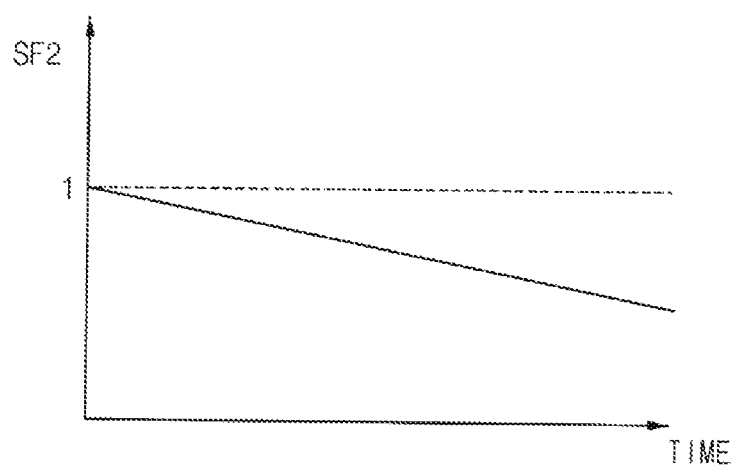
FIG. 10 is a graph illustrating a scale factor generated by the comparator of FIG. 6.

FIG. 6 is a block diagram illustrating the driving controller 200 of FIG. 1. FIG. 7 is a graph illustrating a ratio between a target current IT1 and a sensed current IS1 which are inputted to a comparator 240 of FIG. 6. FIG. 8 is a graph illustrating a scale factor SF1 generated by the comparator 240 of FIG. 6. FIG. 9 is a graph illustrating a ratio between a target current IT2 and a sensed current IS2 which are inputted to the comparator 240 of FIG. 6. FIG. 10 is a graph illustrating a scale factor SF2 generated by the comparator 240 of FIG. 6.

Referring to FIGS. 1 to 10, the driving controller 200 may generate compensation values COMP of the display panels 1000A, 1000B, 1000C and 1000D based on the currents of the display panels 1000A, 1000B, 1000C and 1000D and may generate data signals DATA of the display panels 1000A, 1000B, 1000C and 1000D based on the compensation values COMP. Data signals DATA may be output from the driving controller 200 to the data driver 500.

As illustrated in FIG. 6, the driving controller 200 may include an image analyzer 220 configured to analyze the input image data IMG and generate a target current IT. The driving controller 200 may include a comparator 240 configured to compare the target current IT and the sensed current IT of the current sensor 700 to generate the compensation value COMP. The driving controller 200 may also include and a compensator 260 configured to generate the data signal DATA based on the input image data IMG and the compensation value COMP.

For example, the target current IT of the first display panel 1000A may be determined based on the input image data IMG applied to the first display panel 1000A. Also, the target current IT of the first display panel 1000A may be determined based on the input image data IMG applied to the first display panel 1000A every frame.

Although not illustrated in FIG. 2, the sensed current IS may be a digital current signal outputted from the current sensor 700.

The compensation value COMP may be a scale factor SF which is multiplied by a grayscale value of the input image data IMG.

For example, when the sensed current IS is greater than the target current IT, the scale factor SF may be set to be less than 1. When the sensed current IS is greater than the target current IT, the input image data IMG may be compensated to decrease the sensed current IS so that the scale factor SF may be set to be less than 1.

When the sensed current IS is less than the target current IT, the scale factor SF may be set to be greater than 1. When the sensed current IS is less than the target current IT, the input image data IMG may be compensated to increase the sensed current IS so that the scale factor SF may be set to be greater than 1.

For example, FIG. 7 represents a first target current IT1 and a first sensed current IS1 of the first display panel 1000A. Assuming that the display image of the first display panel 1000A is constant regardless of time, the first target current IT1 may have a constant value. However, the first sensed current IS1 may gradually increase as time passes. A reason why the first sensed current IS1 gradually increases may be due to various factors including an increase of temperature of the first display panel 1000A and a driver of the first display panel 1000A.

Due to the increase of the first sensed current IS1 of the first display panel 1000A, a difference of the first target current IT1 and the first sensed current IS1 may increase, and accordingly a display luminance of the first display panel 1000A may be different from and a target luminance of the first display panel 1000A. Thus, the comparator 240 may generate the first scale factor SF1 illustrated in FIG. 8 based on a ratio of the first target current IT1 and the first sensed current IS1.

FIG. 9 represents a second target current IT2 and a second sensed current IS2 of the second display panel 1000B. Assuming that the display image of the second display panel 1000B is constant regardless of time, the second target current IT2 may have a constant value. However, the second sensed current IS2 may gradually increase as time passes.

Due to the increase of the second sensed current IS2 of the second display panel 1000B, a difference of the second target current IT2 and the second sensed current IS2 may increase, and accordingly a display luminance of the second display panel 1000B may be different from and a target luminance of the second display panel 1000B. Thus, the comparator 240 may generate the second scale factor SF2 illustrated in FIG. 10 based on a ratio of the second target current IT2 and the second sensed current IS2.

A ratio of the second sensed current IS2 to the second target current IT2 in FIG. 9 may be greater than a ratio of the first sensed current IS1 to the first target current IT1 in FIG. 7. This means that the degree of change of the second sensed current IS2 of the second display panel 1000B may be greater than the degree of change of the first sensed current IS1 of the first display panel 1000A such that the degree of change of the second scale factor SF2 of FIG. 10 may be set to be greater than the degree of change of the first scale factor SF1 of FIG. 8.

If the first display panel 1000A and the second display panel 1000B are compensated using the same scale factor, one of the first display panel 1000A and the second display panel 1000B may not be properly compensated.

According to embodiments described herein, the current of each of the first to fourth display panels 1000A, 1000B, 1000C and 1000D is sensed and the scale factor of each of the first to fourth display panels 1000A, 1000B, 1000C and 1000D is generated so that the luminance changes of the first to fourth display panels 1000A, 1000B, 1000C and 1000D due to the changes of the sensed currents of the first to fourth display panels 1000A, 1000B, 1000C and 1000D according to time may be properly compensated.

According to embodiments described herein, the currents of the respective display panels 1000A, 1000B, 1000C and 1000D included in the display apparatus may be sensed, the compensation values for the respective display panels 1000A, 1000B, 1000C and 1000D may be generated, and the input image data IMG of the respective display panels 1000A, 1000B, 1000C and 1000D may be compensated.

Thus, the accuracy of the current compensation may be greatly enhanced compared to a case in which a same compensation value is applied to the plurality of display panels 1000A, 1000B, 1000C and 1000D. According to embodiments described herein, the display quality of the display apparatus may be enhanced.

Figure 11:
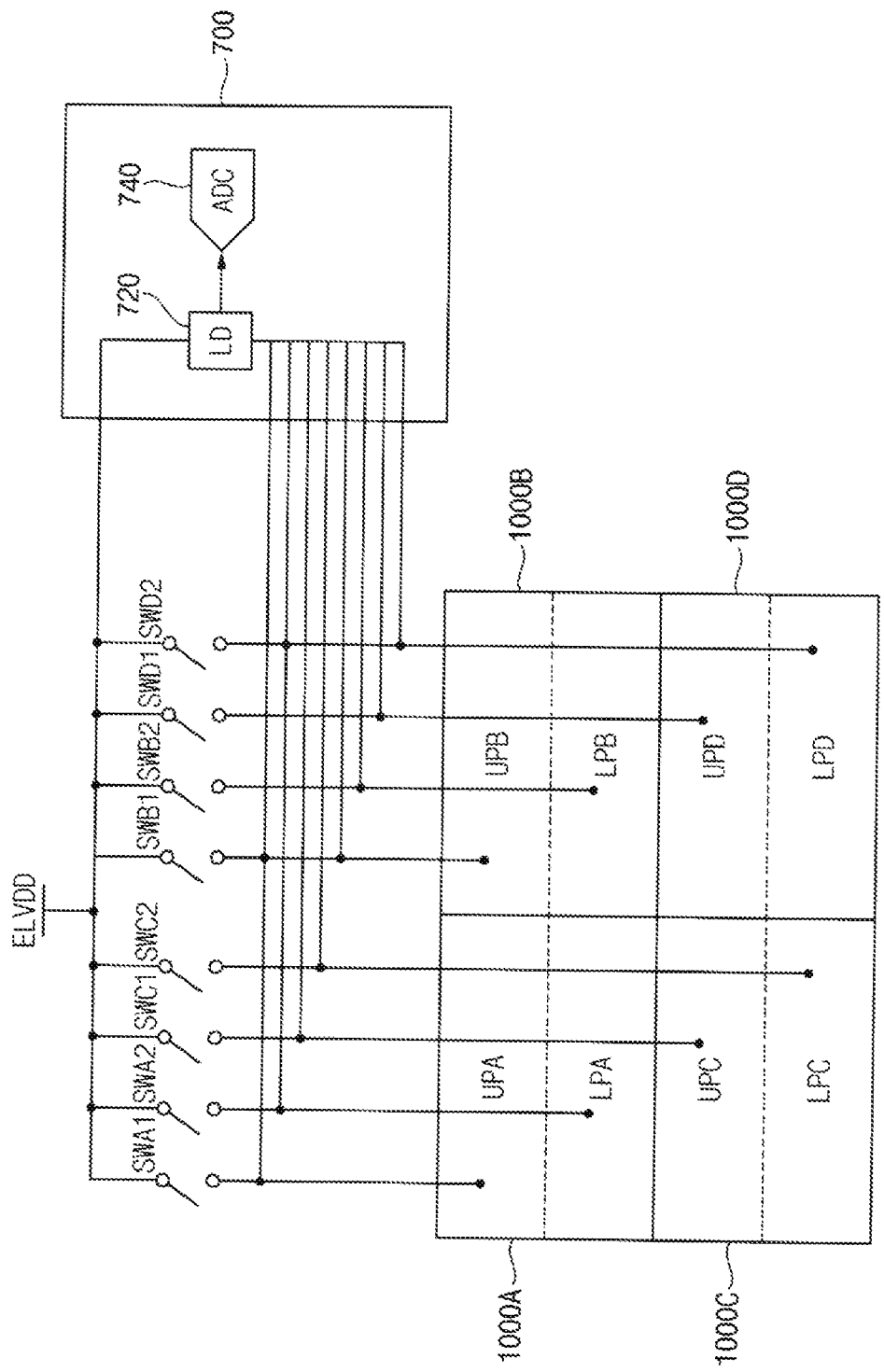
FIG. 11 is a diagram illustrating connections between first to fourth display panels and a current sensor of a display apparatus according to an embodiment of the present inventive concept.
Figure 12:
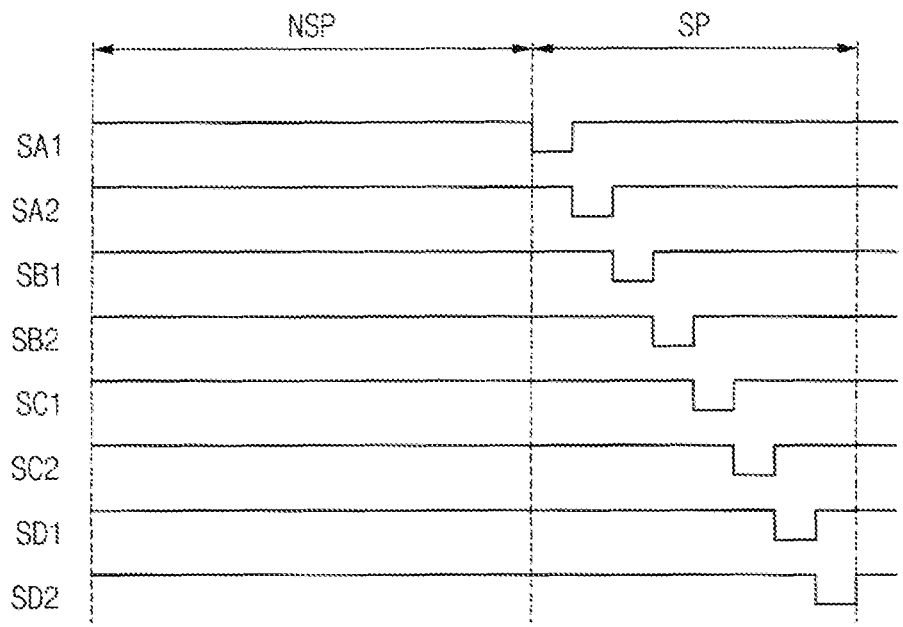
FIG. 12 is a timing diagram illustrating operations of first to eighth switches of FIG. 11.

FIG. 11 is a diagram illustrating connections between first to fourth display panels and a current sensor of a display apparatus according to an embodiment of the present inventive concept. FIG. 12 is a timing diagram illustrating operations of first to eighth switches of FIG. 11.

The display apparatus and the method of driving the display apparatus according to the present embodiment are substantially the same as the display apparatus and the method of driving the display apparatus of the previous embodiment explained referring to FIGS. 1 to 10 except that each of the display panels is divided into a plurality of display blocks. Thus, the same reference numerals will be used to refer to the same or like parts as those described in the previous embodiment of FIGS. 1 to 10 and any repetitive explanation concerning the above elements will be omitted.

Referring to FIGS. 11 and 12, the display apparatus includes a plurality of display panels 1000A, 1000B, 1000C and 1000D connected to each other. In the present embodiment, the display apparatus may include four display panels 1000A, 1000B, 1000C and 1000D disposed in two rows and two columns. The four display panels 1000A, 1000B, 1000C and 1000D may form a large sized television.

For example, the display panels may include a first display panel 1000A, a second display panel 1000B, a third display panel 1000C and a fourth display panel 1000D which are disposed in two rows and two columns.

The first display panel 1000A may include a first display block UPA and a second display block LPA. The second display panel 1000B may include a third display block UPB and a fourth display block LPB. The third display panel 1000C may include a fifth display block UPC and a sixth display block LPC. The fourth display panel 1000D may include a seventh display block UPD and an eighth display block LPD.

In the present embodiment, the current sensor 700 may sense a current from each of the display blocks UPA, LPA, UPB, LPB, UPC, LPC, UPD and LPD.

The display apparatus may include a first power supply line supplying a power to the first display block UPA, a first switch SWA1 connected to the first power supply line, a second power supply line supplying a power to the second display block LPA, a second switch SWA2 connected to the second power supply line, a third power supply line supplying a power to the third display block UPB, a third switch SWB1 connected to the third power supply line, a fourth power supply line supplying a power to the fourth display block LPB, a fourth switch SWB2 connected to the fourth power supply line, a fifth power supply line supplying a power to the fifth display block UPC, a fifth switch SWC1 connected to the fifth power supply line, a sixth power supply line supplying a power to the sixth display block LPC, a sixth switch SWC2 connected to the sixth power supply line, a seventh power supply line supplying a power to the seventh display block UPD, a seventh switch SWD1 connected to the seventh power supply line, an eighth power supply line supplying a power to the eighth display block LPD and an eighth switch SWD2 connected to the eighth power supply line.

In a non-sensing period NSP when the current sensor 700 does not sense the currents of the display blocks UPA, LPA, UPB, LPB, UPC, LPC, UPD and LPD, the first to eighth switches SWA1, SWA2, SWB1, SWB2, SWC1, SWC2, SWD1 and SWD2 may be turned on.

In a sensing period SP when the current sensor 700 senses the currents of the display blocks UPA, LPA, UPB, LPB, UPC, LPC, UPD and LPD, the first switch SWA, the first to eighth switches SWA1, SWA2, SWB1, SWB2, SWC1, SWC2, SWD1 and SWD2 may be sequentially turned on and off.

The first to eighth switches SWA1, SWA2, SWB1, SWB2, SWC1, SWC2, SWD1 and SWD2 may be controlled by first to eighth switching control signals SA1, SA2, SB1, SB2, SC1, SC2, SD1 and SD2. For example, when the first to eighth switching control signals SA1, SA2, SB1, SB2, SC1, SC2, SD1 and SD2 respectively have a high level, the first to eighth switches SWA1, SWA2, SWB1, SWB2, SWC1, SWC2, SWD1 and SWD2 may be respectively turned on. In contrast, when the first to eighth switching control signals SA1, SA2, SB1, SB2, SC1, SC2, SD1 and SD2 respectively have a low level, the first to eighth switches SWA1, SWA2, SWB1, SWB2, SWC1, SWC2, SWD1 and SWD2 may be respectively turned off.

The current sensor 700 may include a load 720 (LD) connected to both ends of the power supply lines supplying the power to the display blocks UPA, LPA, UPB, LPB, UPC, LPC, UPD and LPD and an analog to digital converter 740 (ADC) converting an analog current signal received from the load 720 (LD) to a digital current signal. The load 720 (LD) may be connected both ends of the first switch SWA1, both ends of the second switch SWA2, both ends of the third switch SWB1, both ends of the fourth switch SWB2, both ends of the fifth switch SWC1, both ends of the sixth switch SWC2, both ends of the seventh switch SWD1 and both ends of the eighth switch SWD2.

The current sensor 700 may output the digital current signal to the driving controller 200.

In the present embodiment, the current of each of the first to eighth display blocks UPA, LPA, UPB, LPB, UPC, LPC, UPD and LPD is sensed and the scale factor of each of the first to eighth display blocks UPA, LPA, UPB, LPB, UPC, LPC, UPD and LPD is generated so that the luminance changes of the first to eighth display blocks UPA, LPA, UPB, LPB, UPC, LPC, UPD and LPD due to the changes of the sensed currents of the first to eighth display blocks UPA, LPA, UPB, LPB, UPC, LPC, UPD and LPD according to time may be properly compensated.

According to the present embodiment, the currents of the respective display blocks UPA, LPA, UPB, LPB, UPC, LPC, UPD and LPD of the display panels 1000A, 1000B, 1000C and 1000D included in the display apparatus may be sensed, the compensation values for the respective display blocks UPA, LPA, UPB, LPB, UPC, LPC, UPD and LPD may be generated and the input image data IMG of the respective display blocks UPA, LPA, UPB, LPB, UPC, LPC, UPD and LPD may be compensated.

Thus, the accuracy of the current compensation may be greatly enhanced compared to a case in which the same compensation value is applied to the plurality of display panels 1000A, 1000B, 1000C and 1000D. In addition, the accuracy of the current compensation may be further enhanced compared to a case in which the same compensation value is applied to the display panel. Thus, the display quality of the display apparatus may be enhanced.

Figure 13:
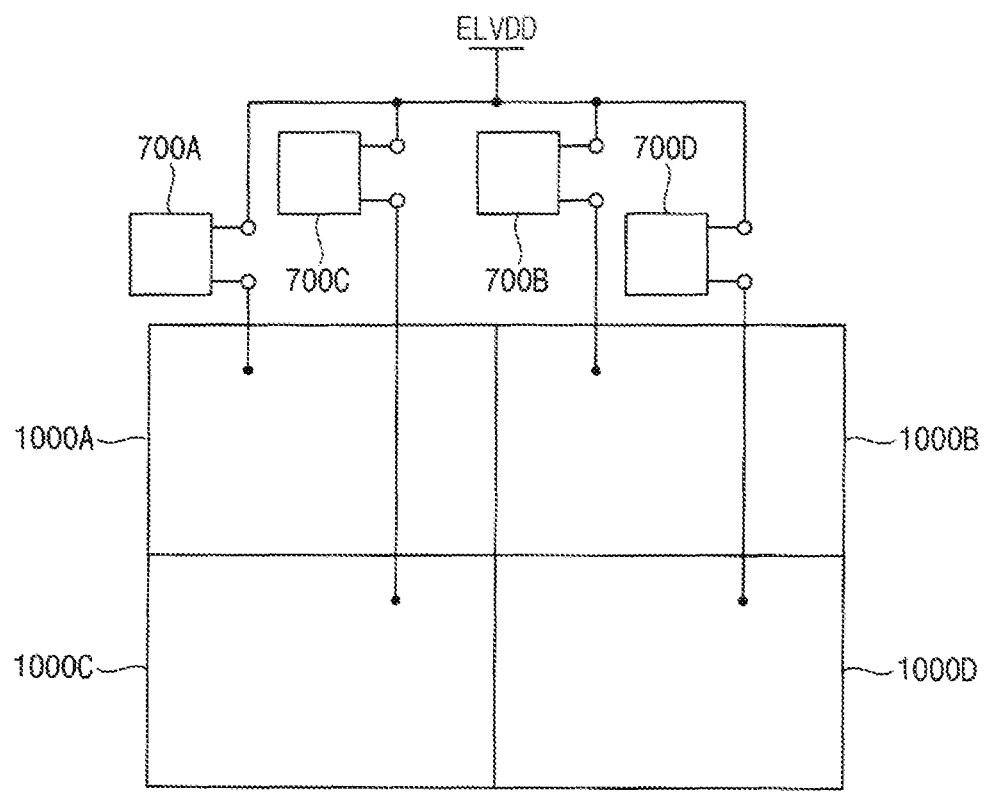
FIG. 13 is a diagram illustrating connections between first to fourth display panels and first to fourth current sensors of a display apparatus according to an embodiment of the present inventive concept.

FIG. 13 is a diagram illustrating connections between first to fourth display panels 1000A, 1000B, 1000C and 1000D and first to fourth current sensors 700A, 700B, 700C and 700D of a display apparatus according to an embodiment of the present inventive concept.

The display apparatus and the method of driving the display apparatus according to the present embodiment are substantially the same as the display apparatus and the method of driving the display apparatus of the previous embodiment explained referring to FIGS. 1 to 10 except that the number of the display panels is same as the number of the current sensors. Thus, to the same reference numerals will be used to refer to the same or like parts as those described in the previous embodiment of FIGS. 1 to 10 and any repetitive explanation concerning the above elements will be omitted.

Referring to FIG. 13, the display apparatus includes a plurality of display panels 1000A, 1000B, 1000C and 1000D connected to each other. In the present embodiment, the display apparatus may include four display panels 1000A, 1000B, 1000C and 1000D disposed in two rows and two columns. The four display panels 1000A, 1000B, 1000C and 1000D may form a large sized television.

For example, the display panels may include a first display panel 1000A, a second display panel 1000B, a third display panel 1000C and a fourth display panel 1000D which are disposed in two rows and two columns.

In the present embodiment, the display apparatus may include a plurality of current sensors 700A, 700B, 700C and 700D. The current sensors 700A, 700B, 700C and 700D may be connected to the display panels 1000A, 1000B, 1000C and 1000D in a one-to-one correspondence. The number of the current sensors 700A, 700B, 700C and 700D may be same as the number of the display panels 1000A, 1000B, 1000C and 1000D.

For example, the display apparatus may include four display panels 1000A, 1000B, 1000C and 1000D, one driving controller 200, one power voltage generator 600 and four current sensors 700A, 700B, 700C and 700D.

For example, a first current sensor 700A senses a current of a first display panel 1000A. For example, a second current sensor 700B senses a current of a second display panel 1000B. For example, a third current sensor 700C senses a current of a third display panel 1000C. For example, a fourth current sensor 700D senses a current of a fourth display panel 1000D.

According to the present embodiment, the currents of the respective display panels 1000A, 1000B, 1000C and 1000D included in the display apparatus may be sensed, the compensation values for the respective display panels 1000A, 1000B, 1000C and 1000D may be generated and the input image data IMG of the respective display panels 1000A, 1000B, 1000C and 1000D may be compensated.

Thus, the accuracy of the current compensation may be greatly enhanced compared to a case in which the same compensation value is applied to the plurality of display panels 1000A, 1000B, 1000C and 1000D. Thus, the display quality of the display apparatus may be enhanced.

According to the display apparatus and the method of driving the display apparatus of the present inventive concept as explained above, the display quality of the display apparatus may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:
1. A display apparatus comprising:
a plurality of display panels;
a current sensor configured to sense a current of each of the display panels;
a driving controller configured to generate a compensation value of each of the display panels based on the current of each of the display panels and to generate a compensation value;
a data signal of each of the display panels based on the compensation value;
a data driver configured to convert the data signal into a data voltage and to output the data voltage to each of the display panels;
a switch including a first end connected to the current sensor and a second end directly connected to the display panel to sense the current of the display panel;
a first power supply line configured to supply a power to a first display panel of the display panels;
a first switch connected to the first power supply line;
a second power supply line configured to supply a power to a second display panel of the display panels;
a second switch connected to the second power supply line;
a third power supply line configured to supply a power to a third display panel of the display panels;
a third switch connected to the third power supply line;
a fourth power supply line configured to supply a power to a fourth display panel of the display panels; and
a fourth switch connected to the fourth power supply line,
wherein the first switch, the second switch, the third switch and the fourth switch are turned on in a non-sensing period,
wherein the first switch is turned off and the second switch, the third switch and the fourth switch are turned on in a first duration of a sensing period,
wherein the second switch is turned off and the first switch, the third switch and the fourth switch are turned on in a second duration of the sensing period,
wherein the third switch is turned off and the first switch, the second switch and the fourth switch are turned on in a third duration of the sensing period,
wherein the fourth switch is turned off and the first switch, the second switch and the third switch are turned on in a fourth duration of the sensing period, and
wherein the first, second, third, and fourth durations of the sensing period are contiguous periods that abut each other such that a beginning of the second duration abuts an end of the first duration, a beginning of the third duration abuts an end of the second duration, and a beginning of the fourth duration abuts an end of the third duration.

2. The display apparatus of claim 1, further comprising:
a first power supply line configured to supply a power to a first display panel of the display panels;
a first switch connected to the first power supply line;
a second power supply line configured to supply a power to a second display panel of the display panels; and
a second switch connected to the second power supply line.

3. The display apparatus of claim 2, wherein the first switch and the second switch are turned on in a non-sensing period.

4. The display apparatus of claim 3, wherein the first switch is turned off and the second switch is turned on in a first duration of a sensing period, and
wherein the first switch is turned on and the second switch is turned off in a second duration of the sensing period.

5. The display apparatus of claim 4, wherein the display panels are driven in a unit of a frame,
wherein the frame includes an active period and a vertical blank period, and
wherein the sensing period is disposed in the vertical blank period.

6. The display apparatus of claim 2, wherein the current sensor comprises:
a load connected to both ends of the first switch and both ends of the second switch.

7. The display apparatus of claim 1, wherein the current sensor comprises:
a load connected to two ends of a power supply line configured to supply a power to the display panel; and
an analog to digital converter configured to convert an analog current signal received from the load to a digital current signal.

8. The display apparatus of claim 1, wherein the driving controller comprises:
an image analyzer configured to analyze input image data to generate a target current;
a comparator configured to compare the target current and a sensed current of the current sensor to generate a compensation value; and
a compensator configured to generate the data signal based on the input image data and the compensation value.

9. The display apparatus of claim 8, wherein the compensation value is a scale factor which is multiplied by a grayscale value of the input image data,
wherein when the sensed current is greater than the target current, the scale factor is set to be less than 1, and
wherein when the sensed current is less than the target current, the scale factor is set to be greater than 1.

10. The display apparatus of claim 1, wherein each of the display panels comprises:
a plurality of display blocks,
wherein the current sensor is configured to sense a current of each of the display blocks, and
wherein the driving controller is configured to generate a compensation value of each of the display blocks based on the current of each of the display blocks.

11. The display apparatus of claim 1, wherein the display apparatus comprises:
a plurality of the current sensors,
wherein the current sensors are connected to the display panels in a one-to-one correspondence, and
wherein a number of the current sensors is the same as a number of the display panels.

12. A method of driving a display apparatus including a plurality of display panels, the method comprising:
sensing a current of each of the display panels;
generating a compensation value of each of the display panels based on the current of each of the display panels;
generating a data signal of each of the display panels based on the compensation value;
converting the data signal into a data voltage; and
outputting the data voltage to each of the display panels,
wherein the display apparatus further comprises:
a switch including a first end connected to a current sensor and a second end directly connected to the display panel to sense the current of the display panel;
a first power supply line configured to supply a power to a first display panel of the display panels;
a first switch connected to the first power supply line;
a second power supply line configured to supply a power to a second display panel of the display panels;
a second switch connected to the second power supply line;
a third power supply line configured to supply a power to a third display panel of the display panels;
a third switch connected to the third power supply line;

a fourth power supply line configured to supply a power to a fourth display panel of the display panels; and a fourth switch connected to the fourth power supply line, wherein the first switch, the second switch, the third switch and the fourth switch are turned on in a non-sensing period, wherein the first switch is turned off and the second switch, the third switch and the fourth switch are turned on in a first duration of a sensing period, wherein the second switch is turned off and the first switch, the third switch and the fourth switch are turned on in a second duration of the sensing period, wherein the third switch is turned off and the first switch, the second switch and the fourth switch are turned on in a third duration of the sensing period, and wherein the fourth switch is turned off and the first switch, the second switch and the third switch are turned on in a fourth duration of the sensing period, and wherein the first, second, third, and fourth durations of the sensing period are contiguous periods that abut each other such that a beginning of the second duration abuts an end of the first duration, a beginning of the third duration abuts an end of the second duration, and a beginning of the fourth duration abuts an end of the third duration.

13. The method of claim 12, wherein the display panels are driven in a unit of a frame, wherein the frame includes an active period and a vertical blank period, and wherein the sensing period is disposed in the vertical blank period.

14. The method of claim 12, wherein the generating the compensation value comprises:

analyzing input image data to generate a target current; and comparing the target current and the sensed current to generate the compensation value, and wherein the data signal is generated based on the input image data and the compensation value.

15. The method of claim 14, wherein the compensation value is a scale factor which is multiplied by a grayscale value of the input image data, wherein when the sensed current is greater than the target current, the scale factor is set to be less than 1, and wherein when the sensed current is less than the target current, the scale factor is set to be greater than 1.

* * * * *